(12) United States Patent
Pratt et al.

(10) Patent No.: US 10,798,077 B1
(45) Date of Patent: Oct. 6, 2020

(54) SECURELY AUTHENTICATING UNTRUSTED OPERATING ENVIRONMENTS

(71) Applicant: HEWLETT-PACKARD DEVELOPMENT COMPANY, L.P., Spring, TX (US)

(72) Inventors: Ian Pratt, Cambridge (GB); David Halls, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 512 days.

(21) Appl. No.: 14/603,991

(22) Filed: Jan. 23, 2015

(51) Int. Cl.
*H04L 29/06* (2006.01)
(52) U.S. Cl.
CPC .................. *H04L 63/08* (2013.01)
(58) Field of Classification Search
CPC ....................................... H04L 63/08
See application file for complete search history.

(56) References Cited

U.S. PATENT DOCUMENTS

| | | | | |
|---|---|---|---|---|
| 8,176,336 B1* | 5/2012 | Mao | ........................ | H04L 9/006 713/189 |
| 2009/0064292 A1* | 3/2009 | Carter | ..................... | G06F 21/57 726/5 |
| 2010/0281273 A1* | 11/2010 | Lee | ........................ | G06F 21/72 713/190 |
| 2011/0093937 A1* | 4/2011 | Mantle | ................. | G06F 21/6218 726/6 |
| 2012/0266252 A1* | 10/2012 | Spiers | ................. | H04L 63/0218 726/26 |
| 2012/0324236 A1* | 12/2012 | Srivastava | .............. | G06F 21/64 713/189 |
| 2015/0220709 A1* | 8/2015 | Jung | ....................... | G06F 21/45 713/155 |

* cited by examiner

*Primary Examiner* — Linglan E Edwards
*Assistant Examiner* — Forrest L Carey
(74) *Attorney, Agent, or Firm* — HPI Patent Department

(57) ABSTRACT

Approaches for securely authenticating untrusted operating environments. A software module intercepts a message which requires a first operating environment to authenticate itself to a service or resource provider. The software module executes outside of the first operating environment. The first operating environment lacks access to an authentication mechanism necessary to successfully authenticate to the service or resource provider. The software module notifies a second operating environment of the message. The second operating environment determines that the first operating environment should be permitted to authenticate to the service or resource provider. The second operating environment obtains authentication data generated using the authentication mechanism. The second operating environment provides the authentication data to the first operating environment to allow the first operating environment to authenticate itself to the service or resource provider.

21 Claims, 4 Drawing Sheets

SECURELY AUTHENTICATING UNTRUSTED OPERATING ENVIRONMENTS

FIELD OF THE INVENTION

Embodiments of the invention relate to the authentication of an operating environment without exposing of any means to do so to the operating environment.

BACKGROUND

In order to gain access to a computerized resource or service, it may be necessary for a requesting party to present an authentication credential to allow the identity of the requesting part to be authenticated. For example, an application might authenticate itself to another application by presenting an authentication credential such as a password, a hash value or checksum, or a certificate. Once valid authentication credentials are presented, the requesting party may gain access to the desired resources.

In some instances, the process of authenticating a hardware or software entity may be performed or assisted by an authentication server. An authentication server is a network service that authenticates credentials submitted by a requesting party. When a requesting party submits a valid set of credentials (such as a username and password combination) to the authentication server, the requesting party receives in return a cryptographic ticket which the requesting party may use to access certain restricted resources or services allowed by the authentication server.

A password manager is an application which manages a set of authentication credentials for a user. The user need only remember one set of authentication credentials ("primary authentication credentials") to present to the password manager. Once the password manager successfully validates the user's primary authentication credentials, the user gain access to one or more sets of secondary authentication credentials associated with other entities. Depending on how the password manager is implemented, the user may or may not know the values of the other secondary authentication credentials (and for security reasons the secondary authentication credentials may be updated frequently by the password manager). In this way, the user is saved the responsibility of remembering and managing the different sets of secondary authentication credentials.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for securely authenticating untrusted operating environments are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Architecture Overview

Figure 1:
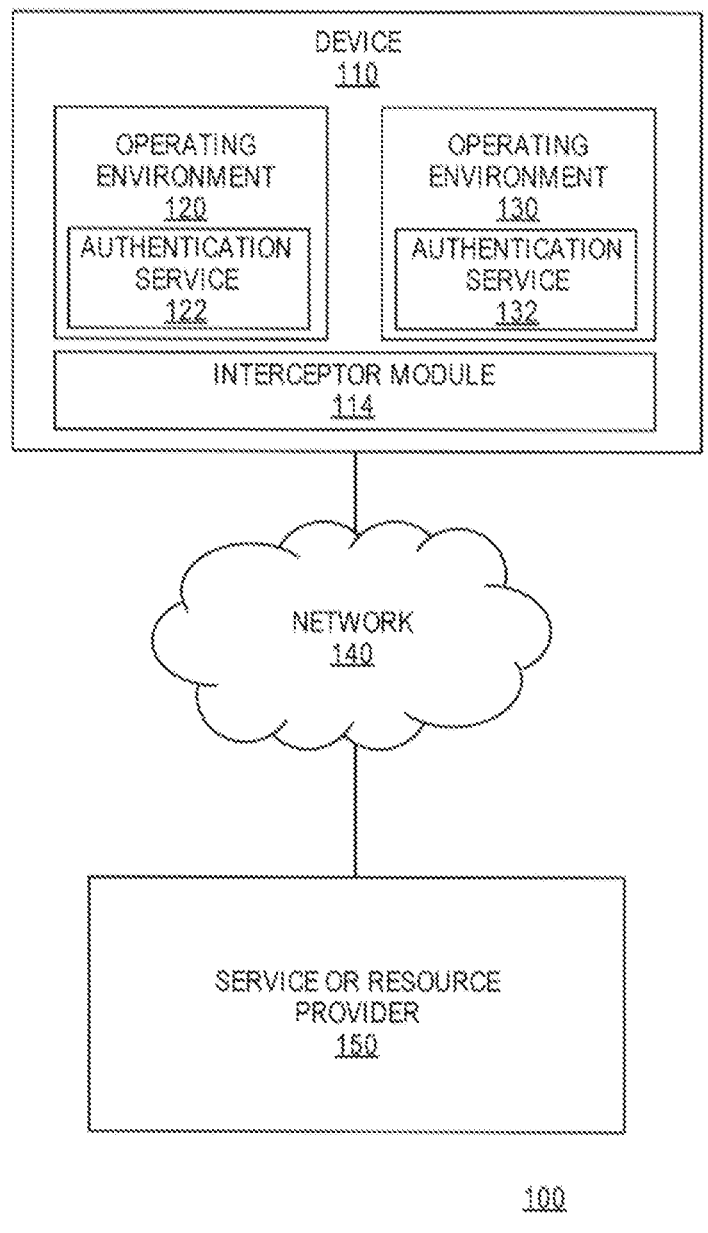
FIG. 1 is a block diagram of a system according to one embodiment of the invention.

FIG. 1 is a block diagram of a system 100 according to one embodiment of the invention. In an embodiment, system 100 includes device 110, network 140, and service or resource provider 150. System 100 may be used to securely authenticate operating environment 120 to service or resource provider 150 without providing or exposing any authentication means to operating environment 120 which may be potentially compromised by malicious code inadvertently introduced into operating environment 120.

Device 110, as broadly used herein, may be implemented by any computerized device capable of executing operating environment 120 and interceptor module 114. Non-limiting, illustrative examples of device 110 include a personal computer, a mobile computer, an embedded computer, a cell phone, a personal digital assistant (PDA), and the like.

The term "operating environment" broadly refers to any kind of isolated software computer environment. Non-limiting, illustrative examples of an operation environment include a virtual machine, a container, a sandbox environment, a host operating system, and a guest operating system. A host operating system or a guest operating system may execute within each of a virtual machine, a container, and a sandbox environment.

FIG. 1 depicts two operating environments, namely operating environment 120 and 130. Operating environment 120 represents an operating environment wherein malicious code may be inadvertently present or introduced. In contrast, operating environment 130 may correspond to an operating environment deemed more secure or trustworthy than operating environment 120. While FIG. 1 depicts operating environment 120 and 130 as both residing on device 110, in other embodiments operating environment 130 may reside external to device 110, e.g., operating environment 130 might execute on a server in communication with device 110 over network 140.

To illustrate several concrete examples, in an embodiment, operating environment 120 may be implemented by a virtual machine residing on device 110 in which a guest operating system executes, and operating environment 130 may be implemented by a host operating system also executing on device 110. In another embodiment, operating environment 120 may correspond to a virtual machine executing on device 110, while operating environment 120 may correspond to a virtual machine executing on a different physical machine than device 110.

Each operating environment may comprise an authentication service. For example, as shown in FIG. 1, operating environment 120 comprises authentication service 122 and operating environment 130 comprises authentication service 132. An authentication service, as broadly used herein, refers to a component capable of providing authentication data to an operating system. As there are many types of schemas and approaches for performing authentication, the term "authentication service" is meant to broadly cover any software or hardware component capable of providing authentication data to an operating system.

For clarity, authentication data refers to a unit of data or a nonce which is used to authenticate an entity. Authentication data may refer to an authentication credential (i.e., data such as a password or key used by an entity to identify itself) or to data generated in a manner that requires an authentication credential as an input (for example, a response to a challenge or a ticket returned by a service (such as Kerberos) that requires proof of knowledge of the authentication credential).

The authentication data may be generated by an authentication mechanism, which as used herein refers to any means of generating authentication data. As an example, a hash function is an example of an authentication mechanism. The hash value, hash code, or hash produced by the hash function is an example of an authentication data. Continuing with this example, the software executing in operating environment 120 that uses the hash function to generate a hash value is an example of authentication service 122.

Another example of authentication service 122 is a library which accessing an authentication mechanism (such as a hash function stored on device 110 or elsewhere) to generate authentication data. Note that the hash function may, but need not, reside on device 110, as authenticate service may communicate with another entity external to device 110 in obtaining authentication data. As such, not all authentication mechanisms need be stored on device 110.

Other examples of authentication data include a password, a certificate, bio metric information, and a shared/secret/password. In some instances, it may be necessary for an authentication service to exchange communications with the party requiring authentication to obtain certain information used to generate the authentication data.

Interceptor module 114 refers to a software module, executing on the same physical machine as operating environment 120, which is responsible for intercepting certain types of communications exchanged between operating environment 120 and service or resource provider 150. The behavior of interceptor module 114 will be discussed in the discussion of FIG. 2 below.

Network 140 refers to any type of communication channel over which device 110 may communicate with service or resource provider 150. For example, network 140 may correspond to a packet-based network, such as the Internet. Network 140 may be implemented by a combination of wired and wireless network links.

Service or resource provider 150 (or simply provider 150) corresponds to any entity which may provide a service or resource to a requesting party that is able to successfully authenticate themselves to provider 150. Non-limiting, illustrative examples of provider 150 include a web site, a proxy, a file server, a network switch, or an access point. While FIG. 1 depicts provider 150 as residing on a different physical machine than device 110, in other embodiments not shown in FIG. 1, provider 150 may also reside on device 110 or the physical machine on which operating environment 130 resides (if operating environment 130 does not reside on device 110).

Securely Authenticating Untrusted Operating Environments

Figure 2:
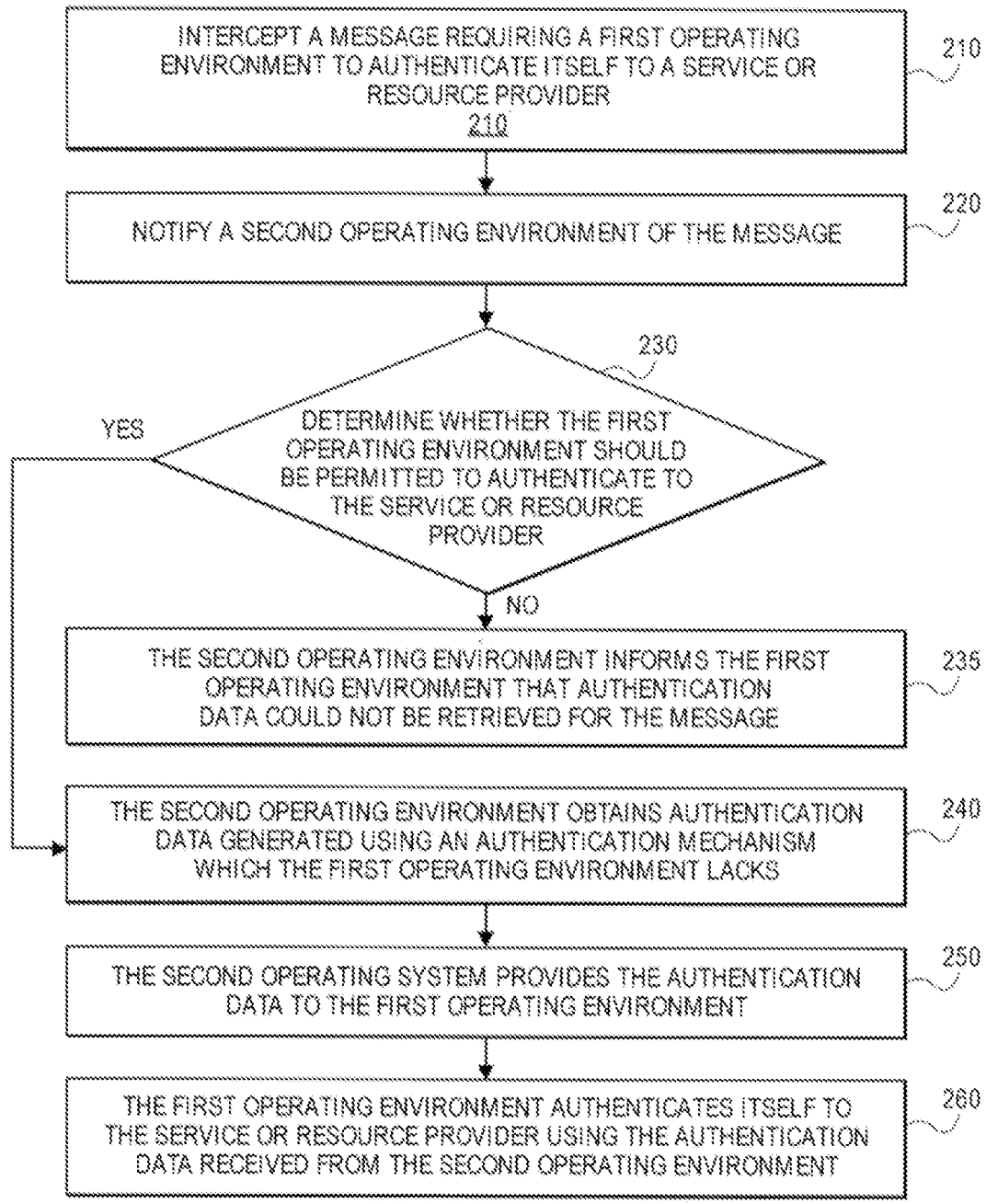
FIG. 2 is a flowchart of the steps for securely authenticating untrusted operating environments according to one embodiment of the invention.

FIG. 2 is a flowchart of the steps for securely authenticating untrusted operating environments according to one embodiment of the invention. For purposes of providing a concrete example, the steps of FIG. 2 shall be explained with reference to securely authenticating operating environment 120 to provider 150.

Prior to the performance of step 210, software executing in operating environment 120 may issue a communication to provider 150 for purposes of requesting a service or resource provided by provider 150. Such a communication would be in accordance with a standard and recognizable protocol. At some point after provider 150 receives a request for a service or resource from operating environment 120, provider 150 may send a message to operating environment 120 which requires operating environment 120 to authenticate itself to provider 150.

In step 210, interceptor module 114 intercepts a message which requires operating environment 120 to authenticate itself to provider 150. The intercepted message is a request, sent from provider 150 to operating environment 120, to operating environment 120 to supply authentication data to provider 150 for purposes of authenticating operating environment 120 to provider 150. For example, the intercepted message may be a challenge message containing a nonce which requires some computation involving the nonce and some credential (e.g. password or private key) to create the resulting authentication data. If the proper authentication data is presented by operating environment 120 in response to the challenge message, provider 150 would authenticate operating environment 120.

In an embodiment, the intercepted message of step 210 may be intercepted before the message is received by operating environment 120. In an alternate embodiment, the intercepted message of step 210 may be intercepted after the message is received by operating environment 120 but before authentication service 122 is notified of the authentication request. As an example, the Windows operating system® available from Microsoft Corporation employs a certain API to call into an authentication service for purposes of obtaining authentication data. This API call made by the operating system intercepted in step 210 by interceptor module 114.

In step 220, interceptor module 114 notifies operating environment 130 of the message intercepted in step 210. In an embodiment, the intercepted message of step 210 may be serialized to facilitate its transportation to operating environment 130.

In step 230, operating environment 130 determines whether operating environment 120 should be permitted to authenticate itself to provider 150. This determination may be made in consultation with a policy that considers a variety of factors, which as the particular action being requested and particular circumstances surrounding such request.

If the determination of step 230 is negative (i.e., operating environment 130 determines that operating environment 120 should not be permitted to authenticate itself to provider 150, then in step 235 operating environment 130 informs operating environment 120 that no authentication data could be retrieved for the intercepted message. In an embodiment, operating environment 120 may interpret any communication from operating environment 130 as originating from authentication service 122. In this fashion, operating environment might be unaware that the message was intercepted in step 210 and may believe that authentication service 122 is informing operating environment 120 that no authentication data could be retrieved for the intercepted message.

If the determination of step 230 is affirmative (i.e., operating environment 130 determines that operating environment 120 should be permitted to authenticate itself to provider 150, then in step 240, operating environment 130 obtains authentication data. In an embodiment, operating environment 130 obtains authentication data using authentication service 132. Authentication service 132 comprises the appropriate authentication means necessary to generate the authentication data. Notably, operating environment 120 does not possess access to any authentication mechanism capable of generating the authentication data. In particular, while authentication service 122 of operating environment 120 may be non-existent, ineffectual, or otherwise incapable of generating valid authentication data as it lacks any authentication mechanism necessary to do so.

Figure 3:
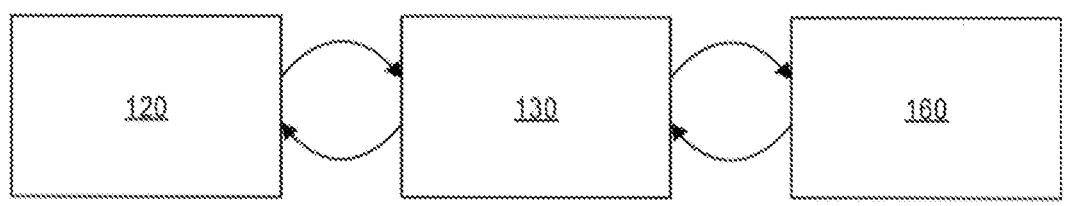
FIG. 3 is a block diagram of a system in which three operating environments may be involved in authenticating a particular operating environment according to one embodiment of the invention.

In another embodiment, operating environment 130 obtains authentication data by communicating with another operating environment. To illustrate such an embodiment, consider FIG. 3, which is a block diagram of a system in which three or more operating environments may be involved in authenticating a particular operating environment according to one embodiment of the invention. With reference to FIG. 3, in step 240, operating environment 130 may request authentication data from operating environment 160. Operating environment 160 may correspond to an operating environment which comprises the authentication mechanism necessary to generate the authentication data. Further, operating environment 160 may be specifically designed to be more secure or trustworthy than either operating environment 120 or operating environment 130 to ensure the privacy and integrity of the authentication mechanism comprised therein. Operating environment 160, may be, but need not be, resident on device 110, as operating environment 160 may exchange communications with operating environment 130 over network 140 in some embodiments.

Note that the authentication mechanism need not reside on device 110. For example, in an embodiment, authentication mechanism may be stored on a portable device, such as a smart card. In such an embodiment, authentication service 132 or operating environment 160 may access the portable device to generate the authentication data using the authentication mechanism stored thereon. Storing the authentication mechanism on a portable device provides an additional security check to ensure malicious code cannot obtain the authentication mechanism.

Returning again to FIG. 2, after operating environment 130 obtains the authentication data, in step 250, operating environment 130 provides the authentication data to operating environment 120. In an embodiment, operating environment 120 is given the impression that the authentication data was provided by authentication service 122, when the authentication data in fact was supplied by operating environment 130.

In step 260, operating environment 120 authenticates itself to provider 150 using the authentication data received from operating environment 130.

Advantageously, operating environment 120 is able to authenticate itself to provider 150 without exposing to any malicious code which may be inadvertently introduced or present within operating environment 120 to the authentication mechanism capable of authenticating to provider 150. In this way, any malicious code present in operating environment 120 are prevented from abusing access to such an authentication mechanism themselves or communicating the authentication mechanism to other malicious parties.

Hardware Mechanisms

Figure 4:
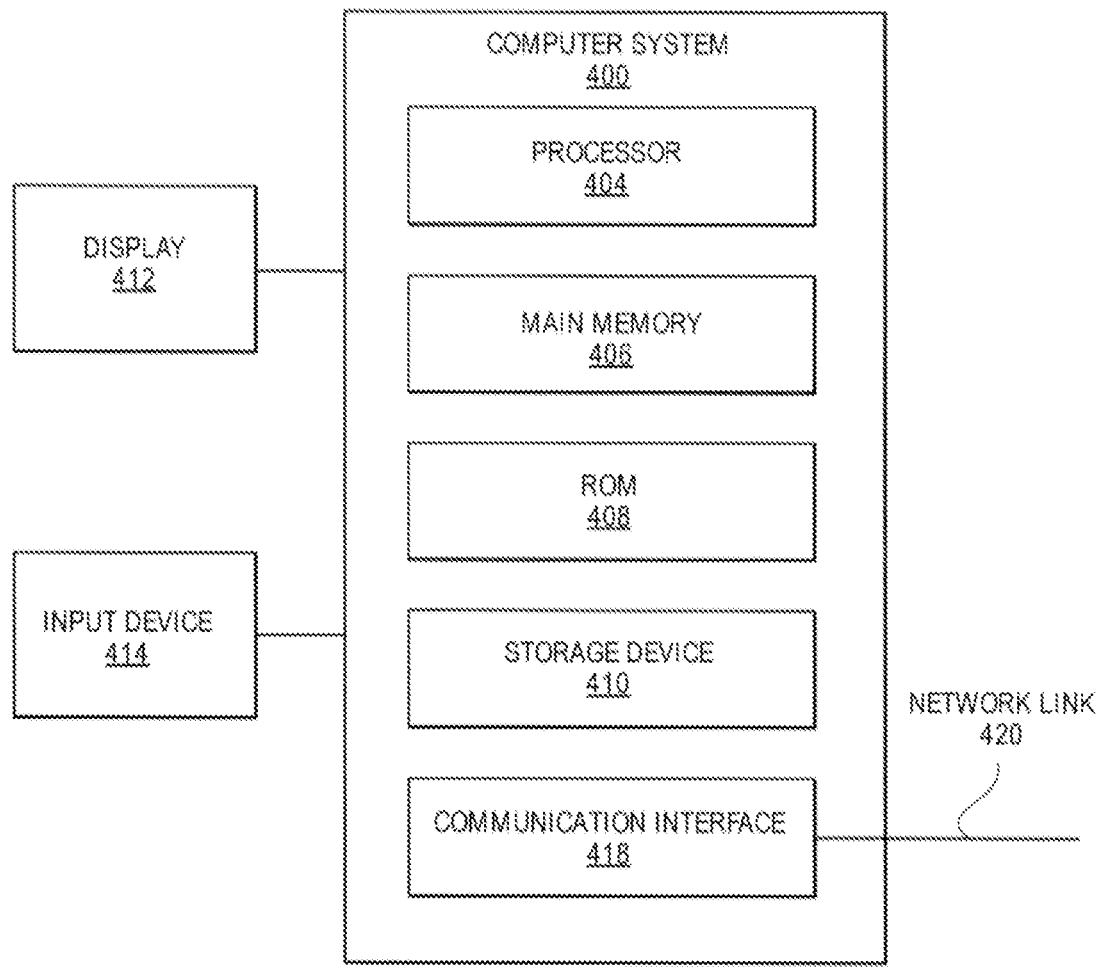
FIG. 4 is a block diagram that illustrates the hardware components of a computer system upon which an embodiment of the invention may be implemented

In an embodiment, one or more of device 110, provider 150, operating environment 120, operating environment 130, and operating environment 160 may correspond to, be implemented on, or include a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for securely authenticating untrusted operating environments, which when executed by one or more processors, causes:
   a first operating environment executing on a physical machine, to send to a service or resource provider implemented by software executing upon physical hardware, a request for a service or resource provided by said service or resource provider;
   a software module intercepting a message which requires said first operating environment to authenticate itself to said service or resource provider, in response to the request for the service or resource;
   wherein said message, intercepted by said software module, was sent from said service or resource provider directly to said first operating environment;
   wherein said software module executes outside of said first operating environment, wherein the first operating environment lacks access to an authentication mechanism necessary to successfully authenticate to the service or resource provider, and wherein said first operating environment is a first virtual machine;
   the software module notifying a second operating environment, different than said first operating environment, of said message, wherein said second operating environment is a second virtual machine;
   upon the second operating environment determining that said first operating environment should be permitted to authenticate to said service or resource provider, the second operating environment obtaining authentication data generated using said authentication mechanism; and
   after the second operating environment obtains said authentication data, the second operating environment providing said authentication data to said first operating environment to allow said first operating environment to authenticate itself to said service or resource provider.

2. The one or more non-transitory machine-readable storage mediums of claim 1, wherein said service or resource provider corresponds to a web site, a proxy, a file server, a network switch, or an access point.

3. The one or more non-transitory machine-readable storage mediums of claim 1, wherein said second operating environment comprises a host operating system executing on the same physical machine as said first operating environment.

4. The one or more non-transitory machine-readable storage mediums of claim 1, wherein said first operating environment and said second operating environment each comprise a separate operating system.

5. The one or more non-transitory machine-readable storage mediums of claim 1, wherein said service or resource provider resides on a different physical machine than said first operating environment.

6. The one or more non-transitory machine-readable storage mediums of claim 1, wherein said first operating environment resides on a different physical machine than said second operating environment.

7. The one or more non-transitory machine-readable storage mediums of claim 1, wherein execution of the one or more sequences of instructions further cause:
   the second operating environment obtaining said authentication data from a third operating environment which is different than said first or second operating environment.

8. The one or more non-transitory machine-readable storage mediums of claim 1, wherein said authentication mechanism is not stored on a physical machine which executes either said first operating environment or said second operating environment.

9. The one or more non-transitory machine-readable storage mediums of claim 1, wherein said authentication mechanism is stored on a portable device.

10. The one or more non-transitory machine-readable storage mediums of claim 1, wherein said software module intercepts said message when said first operating environment issues a request to an authentication service.

11. An apparatus for securely authenticating untrusted operating environments, comprising:
    one or more processors; and
    one or more non-transitory computer readable storage mediums storing one or more sequences of instructions, which when executed, cause:
    a first operating environment executing on a physical machine, to send to a service or resource provider implemented by software executing upon physical hardware, a request for a service or resource provided by said service or resource provider;

a software module intercepting a message which requires said first operating environment to authenticate itself to said service or resource provider, in response to the request for the service or resource;

wherein said message, intercepted by said software module, was sent from said service or resource provider directly to said first operating environment, wherein said software module executes outside of said first operating environment, and wherein the first operating environment lacks access to an authentication mechanism necessary to successfully authenticate to the service or resource provider, and wherein said first operating environment is a first virtual machine;

the software module notifying a second operating environment, different than said first operating environment, of said message, wherein said second operating environment is a second virtual machine;

upon the second operating environment determining that said first operating environment should be permitted to authenticate to said service or resource provider, the second operating environment obtaining authentication data generated using said authentication mechanism; and after the second operating environment obtains said authentication data, the second operating environment providing said authentication data to said first operating environment to allow said first operating environment to authenticate itself to said service or resource provider.

12. The apparatus of claim 11, wherein said service or resource provider corresponds to a web site, a proxy, a file server, a network switch, or an access point.

13. The apparatus of claim 11, wherein said second operating environment comprises a host operating system executing on the same physical machine as said first operating environment.

14. The apparatus of claim 11, wherein said first operating environment and said second operating environment each comprise a separate operating system.

15. The apparatus of claim 11, wherein said service or resource provider resides on a different physical machine than said first operating environment.

16. The apparatus of claim 11, wherein said first operating environment resides on a different physical machine than said second operating environment.

17. The apparatus of claim 11, wherein execution of the one or more sequences of instructions further cause:
the second operating environment obtaining said authentication data from a third operating environment which is different than said first or second operating environment.

18. The apparatus of claim 11, wherein said authentication mechanism is not stored on a physical machine which executes either said first operating environment or said second operating environment.

19. The apparatus of claim 11, wherein said authentication mechanism is stored on a portable device.

20. The apparatus of claim 11, wherein said software module intercepts said message when said first operating environment issues a request to an authentication service.

21. A method for securely authenticating untrusted operating environments, comprising:
a first operating environment executing on a physical machine, sending to a service or resource provider implemented by software executing upon physical hardware, a request for a service or resource provided by said service or resource provider;

a software module intercepting a message which requires said first operating environment to authenticate itself to said service or resource provider, in response to the request for the service or resource;

wherein said message, intercepted by said software module, was sent from said service or resource provider directly to said first operating environment, wherein said software module executes outside of said first operating environment, and wherein the first operating environment lacks access to an authentication mechanism necessary to successfully authenticate to the service or resource provider, and wherein said first operating environment is a first virtual machine;

the software module notifying a second operating environment, different than said first operating environment, of said message, wherein said second operating environment is a second virtual machine;

upon the second operating environment determining that said first operating environment should be permitted to authenticate to said service or resource provider the second operating environment obtaining authentication data generated using said authentication mechanism; and after the second operating environment obtains said authentication data, the second operating environment providing said authentication data to said first operating environment to allow said first operating environment to authenticate itself to said service or resource provider.

* * * * *